US012568338B2

(12) United States Patent
Nguyen

(10) Patent No.: US 12,568,338 B2
(45) Date of Patent: Mar. 3, 2026

(54) PIEZOELECTRIC TRANSDUCER PROVIDING HAPTIC FEEDBACK

(71) Applicant: FLORA INNOVATIONS INC., Dover, DE (US)

(72) Inventor: Tung Thanh Nguyen, San Jose, CA (US)

(73) Assignee: FLORA INNOVATIONS INC., Dover, DE (US)

( * ) Notice: Subject to any disclaimer, the term of this patent is extended or adjusted under 35 U.S.C. 154(b) by 0 days.

(21) Appl. No.: 18/674,846

(22) Filed: May 25, 2024

(65) Prior Publication Data

US 2024/0390939 A1        Nov. 28, 2024

Related U.S. Application Data

(60) Provisional application No. 63/530,690, filed on Aug. 3, 2023, provisional application No. 63/469,390, filed on May 27, 2023.

(51) Int. Cl.
| | |
|---|---|
| *B06B 1/06* | (2006.01) |
| *H04R 1/02* | (2006.01) |
| *H04R 7/04* | (2006.01) |
| *H04R 17/10* | (2006.01) |
| *G06F 3/01* | (2006.01) |

(52) U.S. Cl.
CPC ........... *H04R 17/10* (2013.01); *B06B 1/0603* (2013.01); *H04R 1/028* (2013.01); *H04R 7/045* (2013.01); *G06F 3/016* (2013.01); *H04R 2440/01* (2013.01); *H04R 2499/15* (2013.01)

(58) Field of Classification Search
CPC .... H10N 30/30; H10N 30/302; H10N 30/304; H10N 30/306; H10N 30/308

USPC .................................................. 310/338, 339
See application file for complete search history.

(56) References Cited

U.S. PATENT DOCUMENTS

| | | | |
|---|---|---|---|
| 6,140,740 A | 10/2000 | Porat et al. |
| 7,662,653 B2 | 2/2010 | O'Brien et al. |
| (Continued) | | | |

FOREIGN PATENT DOCUMENTS

WO        2012129247 A2        9/2012

OTHER PUBLICATIONS

PCT-US2024-31187—International Search Report and Written Opinion, dated Sep. 19, 2024, 9 pages.

*Primary Examiner* — Derek J Rosenau
(74) *Attorney, Agent, or Firm* — Flagship Patents; Sikander M. Khan; Ken Milik

(57) ABSTRACT

A piezoelectric transducer is disclosed for providing haptic feedback. The transducer has a stacked structure including a protective layer, a piezoelectric layer, two electrodes positioned on the top and bottom of the piezoelectric layer, an adhesive layer positioned over the piezoelectric layer, and a substrate layer positioned on top of the adhesive layer. The transducer is cured using an autoclave process giving it a curved shape which facilitates electrical connection with a printed circuit board. Curved and custom-shaped molds may be used to effectively increase and precisely control the curvature of the transducer. The transducer may be used to provide haptic feedback in trackpads, keyboards, touch displays, and virtual buttons. One implementation is a bimorph piezoelectric transducer that includes two piezoelectric layers.

21 Claims, 5 Drawing Sheets

(56)  References Cited

U.S. PATENT DOCUMENTS

| | | | |
|---|---|---|---|
| 2006/0238069 A1* | 10/2006 | Maruyama | H03K 17/9643 |
| | | | 310/316.01 |
| 2010/0072860 A1 | 3/2010 | Kim et al. | |
| 2010/0094105 A1 | 4/2010 | Porat et al. | |
| 2012/0055257 A1* | 3/2012 | Shaw-Klein | H10N 30/302 |
| | | | 29/25.35 |
| 2012/0148073 A1 | 6/2012 | Kim et al. | |
| 2013/0270967 A1 | 10/2013 | Dausch et al. | |
| 2014/0035735 A1* | 2/2014 | Zellers | H10N 30/50 |
| | | | 310/319 |
| 2015/0358740 A1 | 12/2015 | Tsai et al. | |
| 2016/0277843 A1 | 9/2016 | Babayoff et al. | |
| 2018/0058954 A1* | 3/2018 | Kihara | G01L 1/16 |
| 2020/0245059 A1 | 7/2020 | Kim et al. | |
| 2021/0140832 A1* | 5/2021 | Wang | G01N 27/49 |
| 2021/0242393 A1* | 8/2021 | Tang | G06F 3/04144 |
| 2022/0314274 A1 | 10/2022 | Meynier et al. | |
| 2024/0024916 A1 | 1/2024 | Kraft et al. | |

* cited by examiner

100

1

PIEZOELECTRIC TRANSDUCER PROVIDING HAPTIC FEEDBACK

PRIORITY DATA

This present application claims priority to and benefit of U.S. Provisional Patent Application No. 63/469,390 filed May 27, 2023, and U.S. Provisional Patent Application No. 63/530,690 filed Aug. 3, 2023, the entire contents of which are incorporated herein by reference.

FIELD OF THE TECHNOLOGY DISCLOSED

The disclosed technology generally relates to a piezoelectric bending transducer for generating sound or haptic feedback by exciting a thin panel. The disclosed technology particularly relates to a novel piezoelectric bending transducer which can be used to generate sounds or haptic feedback.

BACKGROUND OF THE TECHNOLOGY DISCLOSED

Piezoelectric bending transducers have a wide range of applications as haptic engines or loudspeakers in various devices, including trackpads, keyboards, touch displays, and virtual buttons. These transducers come in different configurations: unimorph, bimorph, or multimorph, which consist of one, two, or multiple layers of piezoelectric material, respectively.

In these applications, the transducers typically have a disk-like shape and are positioned between a top touch-sensitive layer and a bottom control PCB board (as described in U.S. Pat. No. 11,404,627B2). Compared to electromagnetic technology that employs coils and magnets, piezoelectric bending transducers offer several advantages, such as a sleek design, low power consumption, and quick response times. These features make them an appealing choice for various electronic devices.

Various methods of electrical connection between the actuator and the PCB board have been proposed and utilized, including flexible printed circuit boards (FPC), electrical wires, soldering (US20150091414), or a conductive base plate (US20200306797). The disclosed technology seeks to overcome drawbacks associated with known haptic engines and piezoelectric transducers, particularly for use in haptic feedback applications.

SUMMARY

The disclosed technology is a novel piezoelectric bending transducer structure that facilitates seamless electrical integration with a PCB, eliminating the need for additional wires, FPC, or similar components. This novel approach not only simplifies the integration process but also reduces manufacturing costs and integration costs. In one aspect, the piezoelectric bending transducer is curved with electrodes positioned at the bottom ends. This design allows seamless placement directly on a PCB. Mechanical and electrical connections are established with the PCB automatically, eliminating the need for extra wires or FPCs. The result is a highly efficient integration process. In another implementation, methods are provided for fabricating the transducer which allows for highly efficient manufacturing.

Implementations of the disclosed technology are directed to a novel transducer and piezoelectric transducer which efficiently provides haptic feedback for various applications, such as trackpads, keyboard, touch displays, and virtual buttons.

In one implementation of the disclosed technology, a novel transducer is provided having a stacked structure. The structure includes several layers which interact in the structure. There is a protective layer, a piezoelectric layer positioned over the protective layer. There are two electrodes positioned on the top and bottom of the piezoelectric layer. The electrode layers are extended beyond the edge of the protective layer. Positioned over the piezoelectric layer is an adhesive layer. A substrate layer is positioned on top of the adhesive layer.

In one aspect of the disclosed technology, the protective layer may be fabricated from epoxy, polyimide, or a composite fabric. Electrodes may be made from a thin strip of copper foil.

In another aspect, the substrate layer is fabricated from a material with low coefficient of thermal expansion, which plays a crucial role in the fabrication of the transducer, as will be described in what follows. The substrate may preferably be fabricated from carbon fiber fabric, glass, or ceramic.

In one implementation, the stacked structure is cured using a high temperature autoclave curing process which bonds the layers of the stacked structure. After the entire stacked structure is assembled, it is placed on a flat mold and subjected to a high-temperature (180-200 degrees C.) curing process under vacuum conditions for 4-6 hours, utilizing a composite bagging process and an autoclave curing. As a result, the stacked layers firmly bond together as the epoxy resets. Because of the low coefficient of thermal expansion for the substrate, the resulting transducer is curved-shaped, which facilitates positive connection of the electrodes to the electrical terminals on a printed circuit board.

In another aspect, instead of a flat mold, curved molds may be used to increase the curvature of the transducer. The disclosed structure is advantageous in manufacturing of the transducer and associated haptic devices. The electrodes extend from the bottom of the transducer and form an almost automatic connection between the electrodes of the transducer and the conductive pads on the printed circuit board. Thus, the curved shape of the transducer facilitates electrical connection when mounted on a printed circuit board (PCB).

Other variations are contemplated for using a curved mold during the curing process. In one implementation, the mold is curved. In another aspect the mold is flat with a raised inner portion to increase effective curvature of the transducer. In another aspect, the mold is curved with a raised inner portion, which allows precise control of the curvature of the transducer.

In another implementation of the disclosed technology, a trackpad uses the curved piezoelectric transducer. A printed circuit board (PCB) is provided for mounting the piezoelectric transducer thereon. The piezoelectric transducer has a curved shape as previously described, which facilitates electrical connections between electrodes in the transducer with copper pads on a printed circuit board (PCB). A touch sensitive layer mechanically connects to the piezoelectric transducer. In operation, when finger pressure is applied to the touch sensitive layer, a touch force is provided to the transducer, which generate a voltage signal across the copper pads. The touch force results in haptic feedback on the touch sensitive layer, inducing vibration in the transducer. The mechanical connection between the touch sensitive layer and the piezoelectric transducer may be provided by double-sided tape. In another aspect, the electrodes and the transducer and the copper pads on the printed circuit board may be coated or plated with silver or gold to enhance electrical conductivity between the transducer and the printed circuit board.

In another implementation, a bimorph piezoelectric transducer is provided also having a stacked structure but including two piezoelectric layers. This transducer includes a bottom protective layer, a first piezoelectric layer positioned on top of the bottom layer, two electrodes adjacent to and at the bottom of the piezoelectric layer. An adhesive layer is positioned over the first piezoelectric layer, partially covering the layer. A second piezoelectric layer is positioned on top of the adhesive layer. Two electrodes are positioned at the top and bottom of the second piezoelectric layer, and a second protective layer is positioned on the top of the transducer. Both piezoelectric layers have the same poling direction, along which the dipoles align. This implementation also requires a curing process, where the transducer is cured on a curved mold under high temperatures and vacuum conditions, subjected to high temperature (180-200 degrees C.) for 4-6 hours, to form a transducer having a curved shape. In another implementation, the mold includes a raised inner portion to precisely control the final shape and curvature of the piezoelectric transducer.

BRIEF DESCRIPTION OF THE DRAWINGS

A complete understanding of the present technology disclosed may be obtained by reference to the accompanying drawings, when considered in conjunction with the subsequent detailed description, in which.

DETAILED DESCRIPTION

Figure 1A:
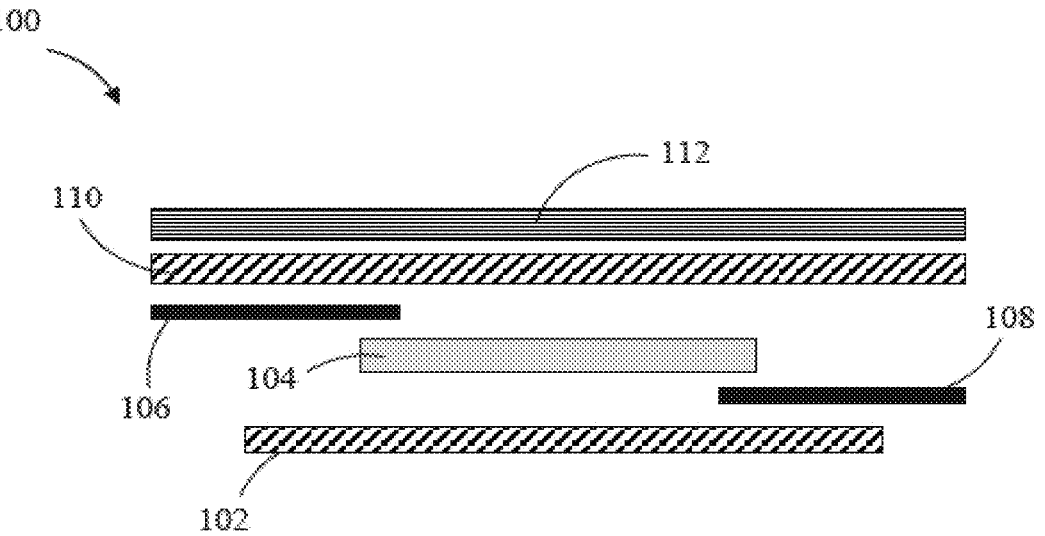
FIG. 1A is a cross-sectional view of a stacking structure of a unimorph piezoelectric transducer.
Figure 1B:
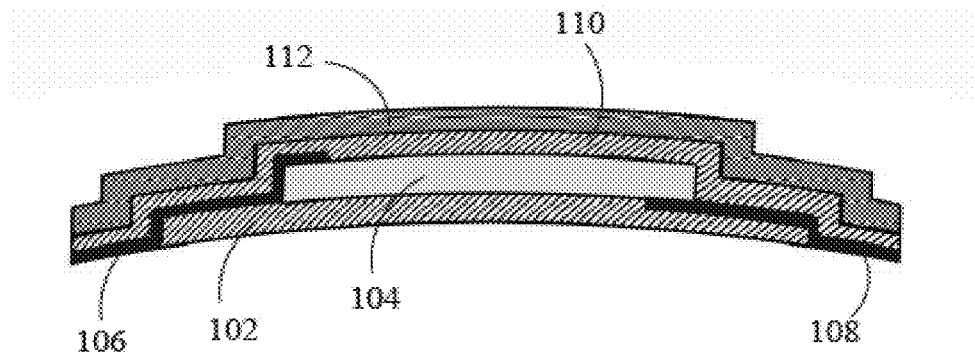
FIG. 1B is a cross-sectional view of the transducer of FIG. 1A after the curing process.

FIG. 1 illustrates a unimorph piezoelectric transducer 100 having a distinctive stacked structure according to the disclosed technology. The transducer comprises a protective layer 102 at the bottom, upon which a piezoelectric layer 104 is positioned. Two electrodes 106 and 108 are located at the top and bottom of the piezoelectric layer 104, respectively. These electrodes extend beyond the protective layer 102.

An adhesive layer 110 is arranged atop the piezoelectric layer, followed by a substrate layer 112 placed on the adhesive layer 110. The protective layer 102 and adhesive layer 110 can be epoxy, polyimide, or a composite fabric (e.g., carbon, Kevlar, or glass fiber mixed with uncured epoxy). The electrodes 106 and 108 can be a thin strip of copper foil. Electrodes may also be made from carbon graphite. The substrate layer 112, on the other hand, can be made from a material with a low coefficient of thermal expansion (CTE) such as carbon fiber fabric, glass, or ceramic.

Figure 1C:
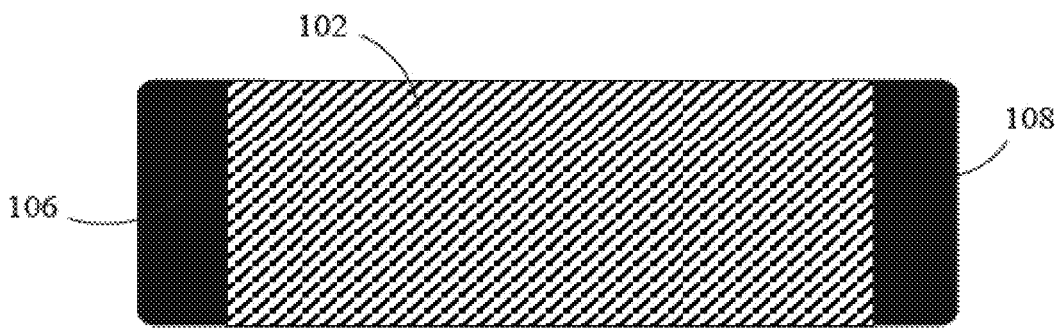
FIG. 1C is a bottom view of the transducer of FIG. 1A after the curing process.

After the entire stacked structure is assembled, it is placed on a flat mold and subjected to a high-temperature (180-200 deg C.) curing process under vacuum conditions for 4-6 hours, utilizing a composite bagging process and an autoclave curing. As a result, the stacked layers firmly bond together as the epoxy resets, and the electrodes 106, 108 become flush with the bottom surface of the transducer 100. Due to the low coefficient of thermal expansion (CTE) of the substrate layer 112, the cured transducer 100 adopts a curved shape, as demonstrated in FIG. 1B. FIG. 1C is the bottom view of the cured transducer 100, which exhibits four rounded corners designed to enhance electrical conductivity.

Figure 2:
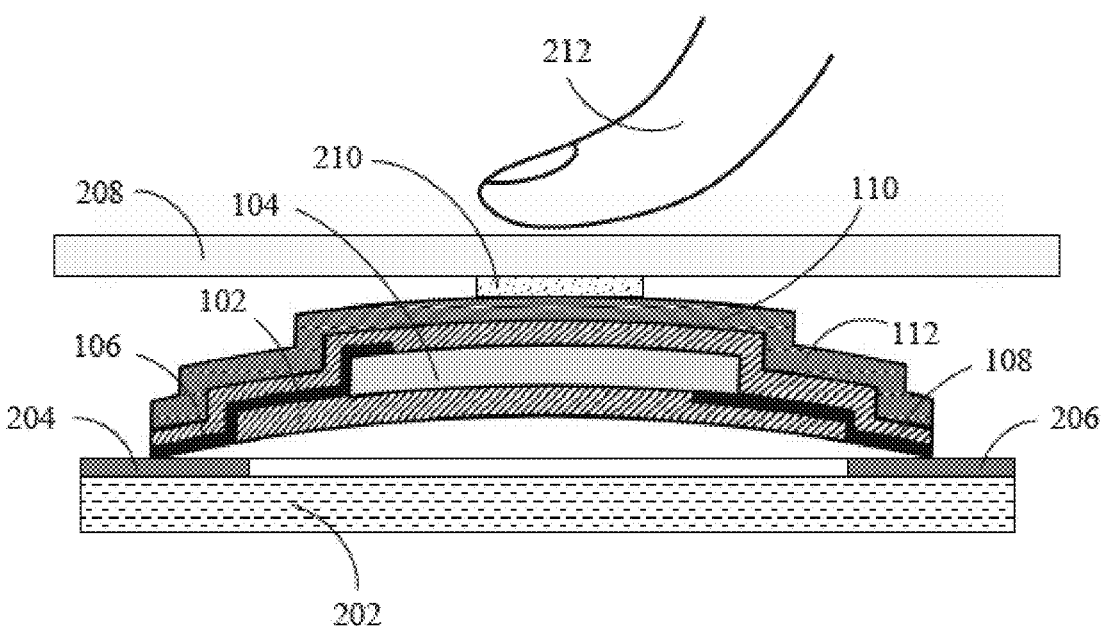
FIG. 2 is a cross-sectional view of the transducer of FIG. 1A integrated into a trackpad application.

Turning now to FIG. 2, a cross-section of the transducer 100 integrated into a trackpad application is shown. The transducer 100 is directly placed on a PCB 202, and the electrodes 106, 108 establish contact with solder pads 204, 206 situated on top of the PCB 202, thereby establishing essential electrical connections.

The transducer 100 is mechanically connected to a touch-sensitive layer 208 through the utilization of double-sided tape 210 or other suitable adhesive. When a user's finger 212 applies pressure to the touch-sensitive layer 208, the touch force is transferred to the transducer 100, thereby generating a voltage signal across the copper pads 204, 206. This push force signal can be utilized to trigger a haptic signal sent to the transducer 100. This AC signal induces vibration in the transducer 100, resulting in haptic feedback on the touch-sensitive layer 208. Consequently, a virtual button with haptic feedback is realized.

The curved shape of the transducer 100 ensures consistent electrical connections between the transducer 100 and the PCB 202, even under the user's applied push force. Simultaneously, it leaves space for the transducer 100 to move under the user's push force or in response to the application of a haptic signal. For enhanced electrical connections and reliability, the electrodes 106, 108 and the copper pads 204, 206 can be coated with silver or gold. Furthermore, tape can be applied to the two ends of the transducer 100 to securely fasten it to the PCB 202 while further improving the electrical connections.

Figure 3:
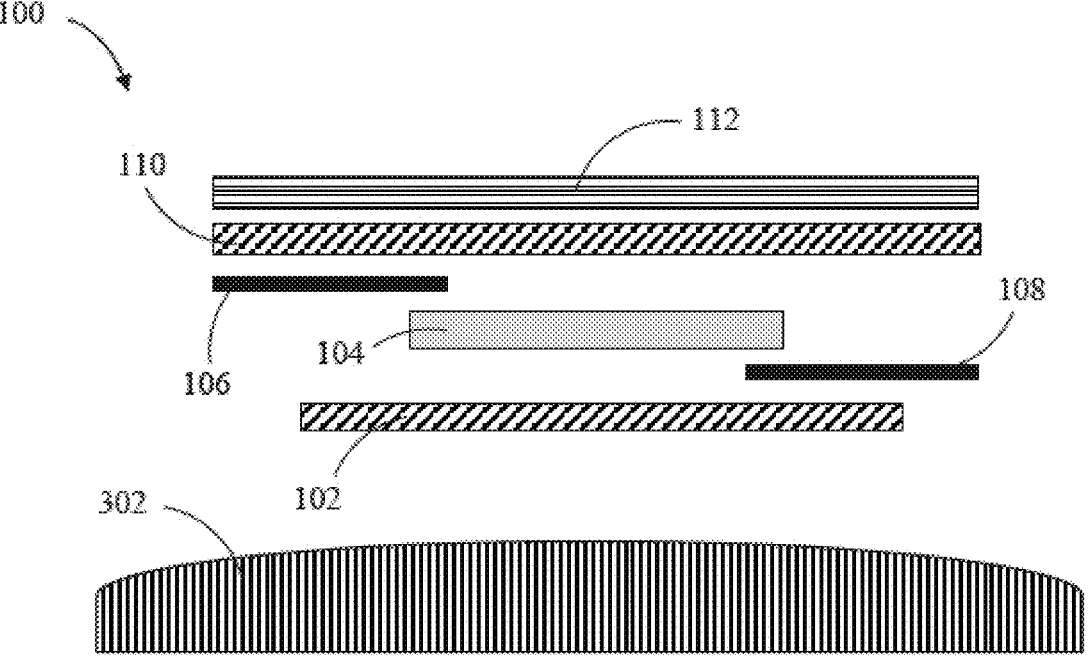
FIG. 3 is a cross-sectional view of the transducer of FIG. 1A cured on a curved mold.

To achieve a further increase in the curvature of the transducer 100, the curing process can be carried out on a curved mold 302 instead of a flat one, as depicted in FIG. 3. By employing this curved mold, the transducer 100 attains a more pronounced curved shape.

Figure 4A:
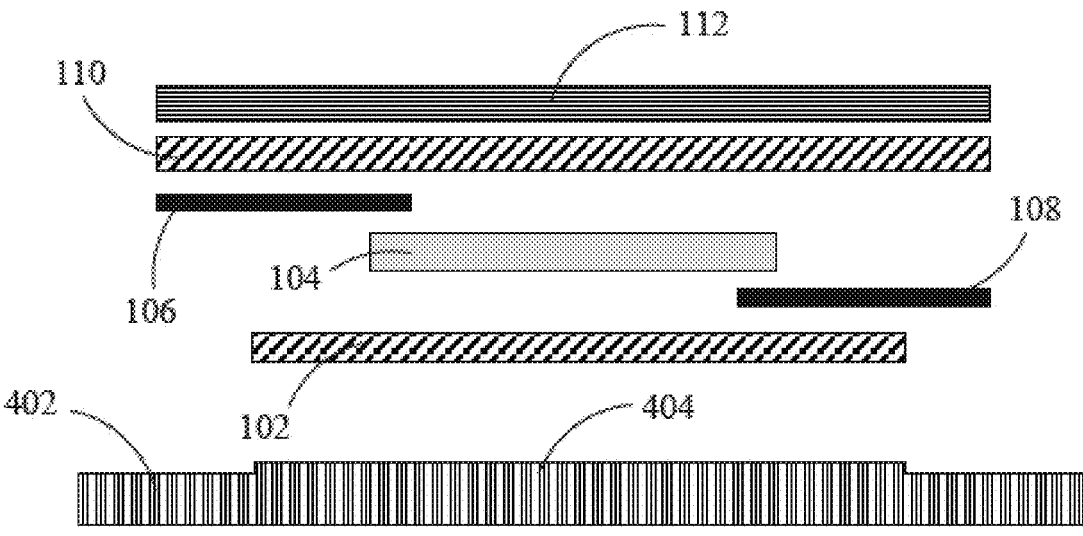
FIG. 4A is a cross-sectional view of the transducer of FIG. 1A cured on a flat mold with a raised inner portion.
Figure 4B:
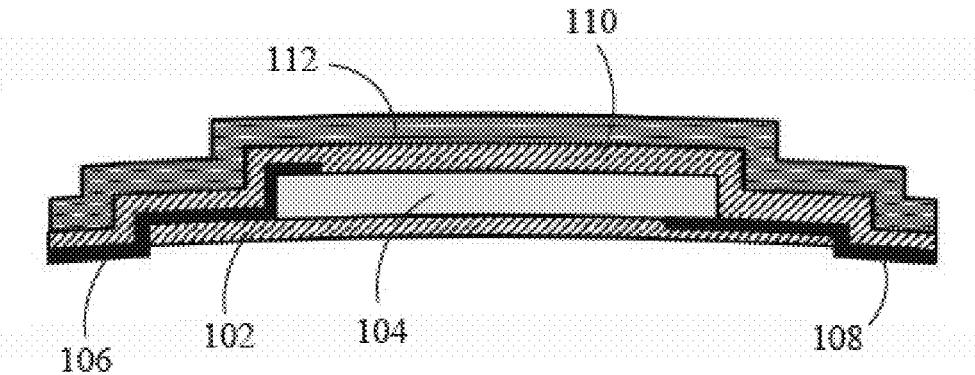
FIG. 4B is a cross-sectional view of the transducer of FIG. 4A after the curing process.

An alternative approach involves using a flat mold 402 with a raised inner portion 404, as demonstrated in FIG. 4A. After the curing process, the resulting shape of the actuator, as shown in FIG. 4B, exhibits a bottom surface of the protective layer 102 positioned at a higher elevation compared to that of the electrodes 106, 108. This configuration contributes to an increased effective curvature of the transducer 100.

In another implementation, the mold may be designed to be curved while incorporating a raised inner portion simultaneously. This method provides another option for achieving the desired curvature of the transducer 100.

FIG. 5 illustrates a stacked structure of a bimorph piezoelectric transducer according to the disclosed technology. The transducer 500 comprises a bottom protective layer 502, with a piezoelectric layer 504 positioned on top of it. Adjacent to and at the bottom of the piezo layer 504 are two electrodes 506, 508. Both electrode layers 506, 508 extend beyond the protective layer 502. On the top of the piezo layer 504, an adhesive layer 510 is provided, which does not entirely cover the piezo layer 504. A second piezo layer 512 is then placed on top of the adhesive layer 510. In this implementation, two additional electrode layers 514, 516 are located at the top and bottom of the second piezo layer 512. The adhesive layer 510 and the electrode 514 are positioned next to each other without any overlap between them. To complete the transducer structure, a second protective layer 518 may be provided on the top of the transducer.

Both piezoelectric layers 504 and 512 should have the same poling direction, along which the dipoles align, as depicted in FIG. 5. The first pair of electrodes 506, 508 can be a thin strip of copper foil, while the second pair of electrodes 514, 516 can be either copper foil or carbon graphite. The transducer 500 can also be a multilayer one, which includes more than two piezoelectric layers, with the same stacked sequence.

Figure 5A:
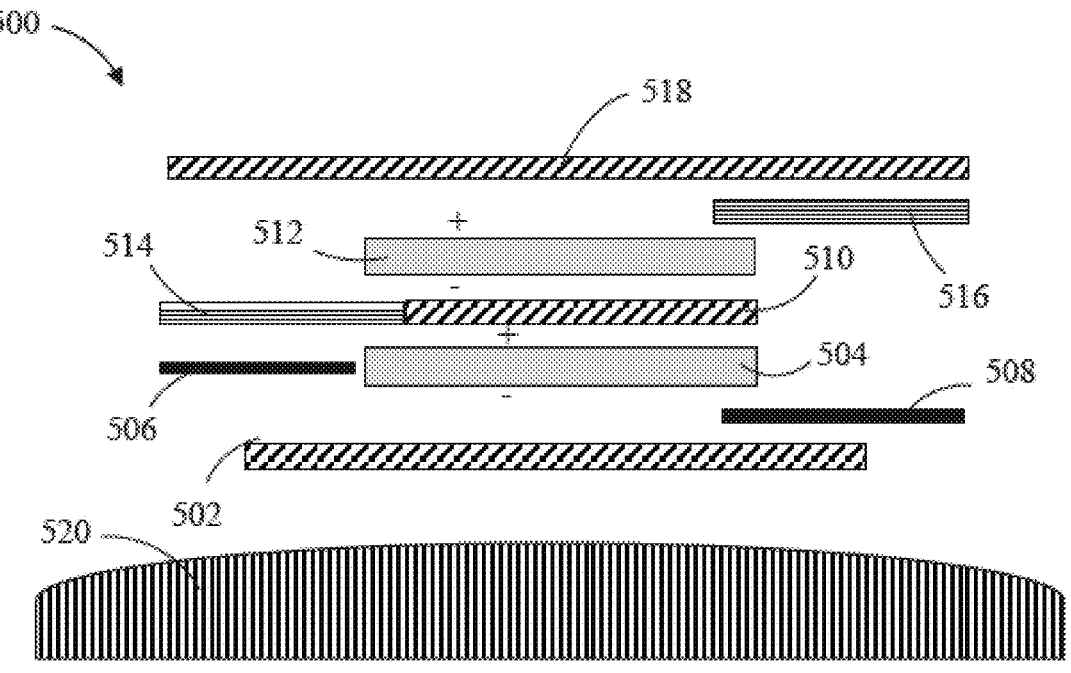
FIG. 5A is a cross-sectional view of a stacked structure of a bimorph piezoelectric transducer.
Figure 5B:
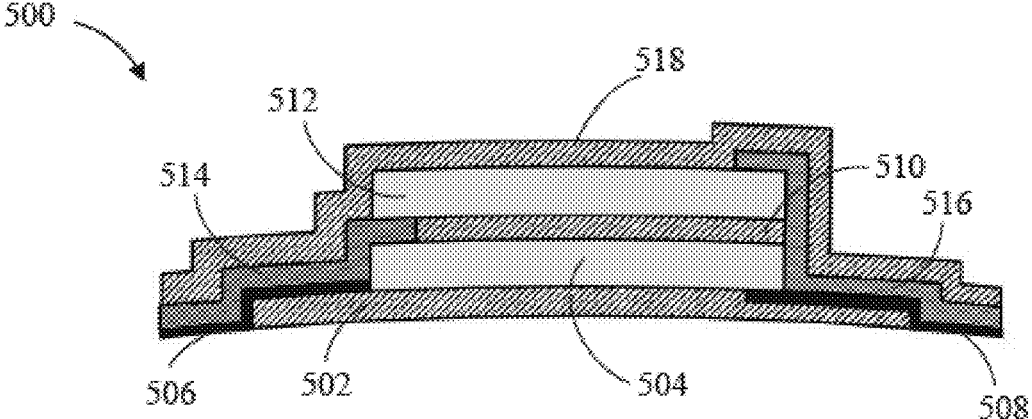
FIG. 5B is a cross-sectional view of the transducer of FIG. 5A after the curing process.

After assembling the entire stacked structure, it is placed on a curved mold 520 and subjected to a high-temperature (180-200 deg C.) curing process under vacuum conditions for 4-6 hours using a composite bagging process in an autoclave apparatus. As the temperature is gradually lowered back to ambient levels, the epoxy resets and forms integral bonds, firmly joining the stacked layers together. Due to the curved shape of the mold 520, the cured transducer 500 also forms a curved shape, as depicted in FIG. 5B. The stacked structure can also be cured on a flat mold, resulting in a high performance flat biomorph transducer for other applications such as audio and sensors.

Figure 5C:
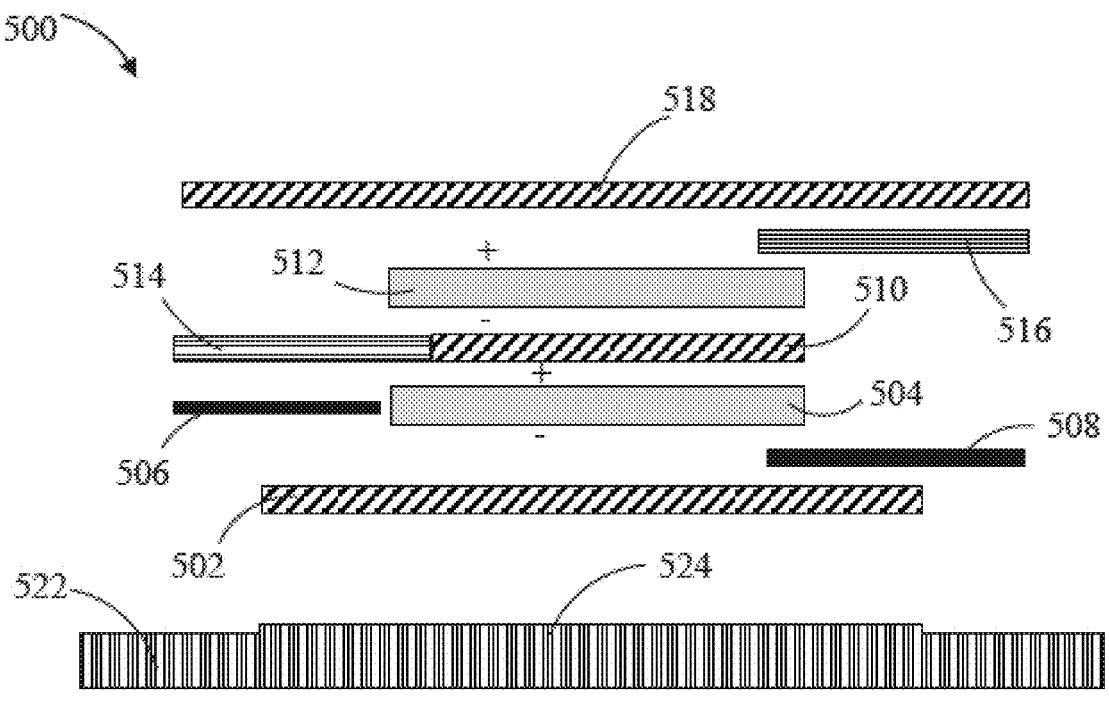
FIG. 5C is a cross-sectional view of a stacked structure of a bimorph piezoelectric transducer of FIG. 5A cured on a flat mold with a raised inner portion.
Figure 5D:
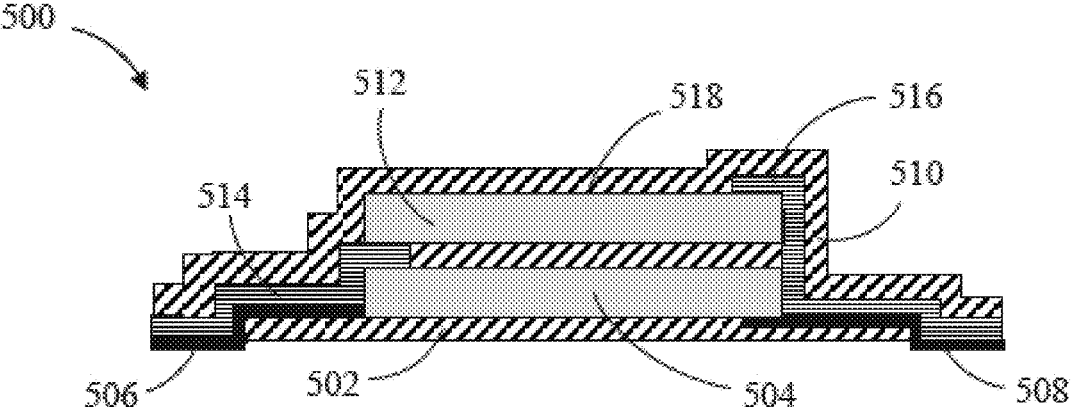
FIG. 5D is a cross-sectional view of the transducer of FIG. 5C after the curing process.

Alternatively, in another aspect, a mold 522 is provided with a raised portion 524, as shown in FIG. 5C. Following the curing process, the resulting shape of the transducer, illustrated in FIG. 5D, shows the bottom surface of the protective layer 502 positioned at a higher elevation compared to that of the electrodes 506, 508. This design choice contributes to an increased curvature of the transducer.

In another implementation, the mold can be designed to be both curved and have a raised inner portion simultaneously, presenting yet another approach to achieve the desired curvature of the transducer 500. This flexibility in mold design allows for precise control over the final shape and curvature of the piezoelectric bending transducer.

Since other modifications and changes in the material, shape, size, number of the parts, and arrangement of the parts will be apparent to those skilled in the art, it has to be understood that the technology disclosed is not considered limited to the above-described implementations of this technology disclosed, and covers all changes and modifications which do not constitute departures from the true spirit and scope of this technology disclosed.

What is claimed is:

1. A transducer, comprising a stacked structure including:
a protective layer;
a piezoelectric layer positioned over the protective layer;
two electrodes positioned at two ends of the piezoelectric layer, the first electrode located on a top surface and the second electrode located on a bottom surface of the piezoelectric layer, the electrode layers extending beyond the edge of the protective layer;

an adhesive layer positioned over the piezoelectric layer; and
a substrate layer positioned on top of the adhesive layer, wherein the entire stacked structure of the protective layer, piezoelectric layer, first and second electrodes, adhesive layer, and substrate layer is subjected to a high-temperature curing process under vacuum conditions, resulting in a curved shape of the transducer due to the low coefficient of thermal extraction of the substrate layer.

2. The transducer of claim 1, wherein the protective layer and the adhesive layer are made from epoxy, polyimide, or a composite fabric.

3. The transducer of claim 1, wherein the electrodes are made from a thin strip of copper foil.

4. The transducer of claim 1, wherein the substrate layer is fabricated from a material with a low coefficient of thermal expansion.

5. The transducer of claim 1, wherein the substrate layer is fabricated from carbon fiber fabric, glass, or ceramic.

6. The transducer of claim 1, wherein the assembled stacked structure is cured using a high temperature autoclave curing process.

7. The transducer of claim 1, wherein the autoclave curing process bonds the layers of the stacked structure.

8. The transducer of claim 7, wherein the corners of the transducer are rounded to enhance electrical connections.

9. The transducer of claim 8, wherein the curved shape of the transducer facilitates electrical connection when mounted on a printed circuit board (PCB).

10. The transducer of claim 7, wherein the curing process is carried out on a curved mold instead of a flat one to increase the curvature of the transducer.

11. The transducer of claim 7, wherein the curing process is carried out using a flat mold with a raised inner portion to increase effective curvature of the transducer.

12. The transducer of claim 7, wherein the curing process is carried out using a curved mold with a raised inner portion to increase the effective curvature of the transducer.

13. A haptic device, comprising:
a printed circuit board (PCB) for mounting a piezoelectric transducer thereon;
a piezoelectric transducer having a curved shape as claimed in claim 9, the curved shape facilitating electrical connections between electrodes in the transducer with copper pads on a printed circuit board (PCB); and
a touch sensitive layer mechanically connected the piezoelectric transducer;
wherein finger pressure applied to the touch sensitive layer transfers touch force to the transducer to generate a voltage signal across the copper pads.

14. The haptic device of claim 13, wherein the touch force results in haptic feedback on the touch sensitive layer, inducing vibration in the transducer.

15. The haptic device of claim 13, wherein the mechanical connection between the touch sensitive layer and the piezoelectric transducer is provided by double-sided tape.

16. The haptic device of claim 13, wherein the electrodes in the transducer and the copper pads on the printed circuit board are coated with silver or gold to enhance electrical conductivity.

17. A piezoelectric transducer, comprising a stacked structure, including:
a bottom protective layer;
a first piezoelectric layer positioned on top of the bottom protective layer;

a first electrode layer positioned at the bottom of the first piezoelectric layer, and a second electrode layer positioned adjacent to and in the same plane as the first piezoelectric layer, the first and second electrode layers extending beyond the edge of the bottom protective layer;

an adhesive layer positioned over the first piezoelectric layer, only partially covering the first piezoelectric layer;

a second piezoelectric layer positioned on top of the adhesive layer;

a third electrode layer positioned at the bottom of the second piezoelectric layer, wherein the third electrode layer and the adhesive layer are positioned next to each other without any overlap between them;

a fourth electrode layer at the top of the second piezoelectric layer; and a second protective layer positioned on the top of the transducer.

18. The transducer of claim 17, wherein the first electrode layer and the second electrode layer are made of carbon graphite or thin strips of copper foil.

19. The transducer of claim 17, wherein the first and second piezoelectric layers have the same poling direction.

20. The transducer of claim 17, wherein the transducer is cured on a curved mold to form a transducer having a permanent curved shape.

21. The transducer of claim 20, wherein the final shape and curvature of the transducer is precisely controlled to ensure consistent electrical connections between the transducer and a printed circuit board.

* * * * *